Nov. 1, 1966 S. I. PERSSON 3,283,271

NOTCHED SEMICONDUCTOR JUNCTION STRAIN TRANSDUCER

Filed Sept. 30, 1963

INVENTOR
STEN I PERSSON

BY Donald Brown
AGENT

United States Patent Office 3,283,271
Patented Nov. 1, 1966

3,283,271

NOTCHED SEMICONDUCTOR JUNCTION STRAIN TRANSDUCER

Sten I. Persson, Los Altos, Calif., assignor to Raytheon Company, Lexington, Mass., a corporation of Delaware Filed Sept. 30, 1963, Ser. No. 312,742
9 Claims. (Cl. 333—71)

This invention relates to strain transducers and, more particularly, to notched strain transducers and to an etching technique and method for making the same. The present invention represents an improvement over the inventions disclosed in copending U.S. patent applications Serial No. 183,940, filed on March 30, 1962, now abandoned, and Serial No. 261,065, filed on February 26, 1963, by Wilhelm Rindner and assigned to the assignee of this invention. These copending applications disclose the use of a concentrated stress to produce a strain confined to a small volume of a shallow junction between regions of semiconductor materials. Strains have been produced in a junction volume by the use of a member having a pointed tip bearing on a surface closet to the junction. It has also been proposed in an application in the names of Wilhelm Rindner and Roger F. Nelson, Serial No. 268,772, filed on March 28, 1963, and assigned to the same assignee of this invention, that incisions in the form of a saw cut or V-shaped groove be utilized to produce strains in junction or barrier regions. Grooves or saw cuts produced by the method described in this copending application provides grooves having large radius of curvature corners.

Accordingly, it is the primary object of this invention to provide a new and improved notched or grooved strain transducer.

It is an additional object of this invention to provide a transducer having improved strain transmitting notches.

It is a further object of this invention to provide notches or grooves with small dimensional corners which have improved strain transmitting characteristics.

In accordance with this invention a strain transducer comprised of a junction between regions of semiconductor materials is provided with an improved strain transmitting corner dimensioned notch or groove. In one embodiment there is disclosed a notch transducer having a second region of semiconductor diffused after the notch is formed. Another embodiment shows a notch in a transducer having the region of semiconductor formed prior to the formation of the notch.

Additionally, the notch devices of this invention are utilized in embodiments disclosing strain transducer oscillators and pickups of the phonograph type. Furthermore, an additional embodiment shows a notched cantilever strain transducer having a single strain transmitting corner.

Other objectives and features of this invention will become apparent from the following description taken in conjunction with the following drawings, wherein.

Figure 1:
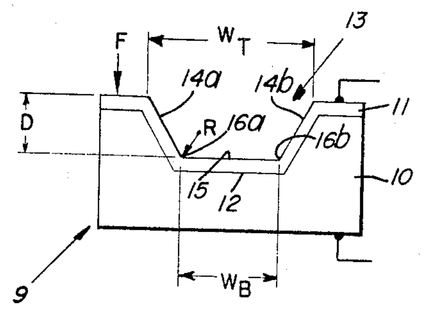
FIG. 1 is a side sectional view of a strain transducer having a junction diffused in after the formation of an improved notch.

Referring now to FIG. 1, there is disclosed a strain transducer 9 of the type having a second region diffused into the original semiconductor substrate or chip after the formation or fabrication of the notch. The strain transducer 9 comprises a first region of semiconductor material 10 doped with an N-type impurity material. A second region of semiconductor material 11 doped with a P-type impurity is shown forming a junction or barrier 12 with material 10. Semiconductor materials 10 and 11 could comprise germanium, silicon, gallium arsenide and other equivalents. N-type dopants could comprise boron, iodine and other equivalents. P-type dopants could comprise phosphorous, aluminum and other equivalents. A notch 13 having corners 16*a* and 16*b*, a bottom 15 and sides 14*a* and 14*b* is shown formed in the transducer 9. The notch of this invention has corner dimensions with a radius of curvature "R" less than about one micron. These fine dimensions which are formed in a manner which will be described at a later time, provide excellent strain transmitting properties. It has also been discovered that junctions lying in the order of less than about .010 inch below the strain transmitting corners provides the best observed results. More particularly, junctions lying at depths of less than about five microns have produced the best strain transmitting qualities as yet observed. Although the following junction depths have been disclosed, it is to be understood that the depth of the junction from the strain transmitting corners 16*a* and 16*b* is also dependent upon the degree of doping and the particular semiconductor materials used.

To form the notch 13 of this invention the following method and technique is utilized. A chip or substrate of 111 crystalographic oriented semiconductor material is selected and for purposes of example will be denoted as silicon. The silicon substrate is then damaged in such a manner that its lattice structure is both deformed and stressed. Damaging is preferably accomplished by scribing with a diamond stylus having a pyramid shaped pointed tip bearing down with a predetermined force on a surface of said silicon substrate. It has also been discovered that it is possible to induce damage into the substrate by electron bombardment.

In practicing the technique for obtaining the notch, it has been discovered that damaging the substrate parallel to the cleavage planes of the substrate provides the best defined corners in the notches. Scribing parallel to the cleavage planes is defined, for the purposes of this invention, as damaging parallel to the lines formed by the intersection of the three 111 cleavage planes with the surface of the silicon crystal substrate. After damaging the substrate, a boiling four molar sodium hydroxide solution is used to preferentially etch and remove the area damaged by the line. This is accomplished by placing the substrate in the aforementioned solution for predetermined periods of time. The following chart is given as an example to show the relationship between length of boiling time, damage, force or stress applied and the resultant dimensions of the formed notch. The dimensions $W_T$ and $W_B$ shown in FIG. 1 define the top and bottom width, respectively, of the notch. The dimension D defines the depth of the notch. It is to be noted from the chart that the depth generally increases with increased boiling times.

SCRIBING FORCE

| | | 3 Grms. | 5 Grms. | 10 Grms. | 15 Grms. | 20 Grms. | 25 Grms. | 30 Grms. |
|---|---|---|---|---|---|---|---|---|
| $N_aOH$ Boilling Time: | | | | | | | | |
| 1 Min | $W_T$ | 12 | 16 | 24 | 24 | 24 | 24 | 25 |
| | $W_B$ | 6 | 8 | ---- | ---- | ---- | ---- | ---- |
| | D | 4 | 4 | 5 | 8 | 9 | 10 | 10 |
| 2 Mins | $W_T$ | 24 | 28 | 24 | 28 | 32 | 32 | 38 |
| | $W_B$ | 16 | 16 | 16 | 18 | 16 | 16 | 8 |
| | D | 5 | 6.5 | 6 | 7 | 10.5 | 14 | 16 |
| 4 Mins | $W_T$ | 80 | 72 | 80 | 88 | 88 | 96 | 96 |
| | $W_B$ | 72 | 56 | 60 | 64 | 66.4 | 54 | 54 |
| | D | 9 | 9 | 15 | 18.5 | 23 | 26 | 29 |
| 8 Mins | $W_T$ | 280 | 280 | 290 | 300 | 304 | 320 | 340 |
| | $W_B$ | 280 | 280 | 276 | 270 | 270 | 264 | 280 |
| | D | 8 | 9 | 13 | 18.5 | 23 | 25 | 28 |

$W_T$, $W_B$, and D in microns.

After the substrate is preferentially etched to form the notch, the substrate is washed in a de-ionized $H_2O$ and methanol solution. The second region of semiconductor material 11 is then formed by a diffusion process such as is well known in the art. From the above description, a new technique or method has been described for producing notches or grooves in semiconductor materials. This new technique essentially relies upon damaging the crystalline or lattice structure of the semiconductor crystal, preferably parallel to the cleavage planes, and then attacking the damaged portion of the semiconductor crystal with an etchant. This technique produces a notch which has interatomic dimensions in the order of a micron or less. There is also disclosed in FIG. 1, an arrow "F" which is representative of a force or pressure applied to a surface of the transducer 9 in order to produce bending of the transducer. Bending of the transducer will produce a strain in the junction 12 by a bending of the corners **16*a* and 16*b***. The force F can be applied as shown in FIG. 1 of the aforementioned copending application Serial No. 183,940.

Figure 2:
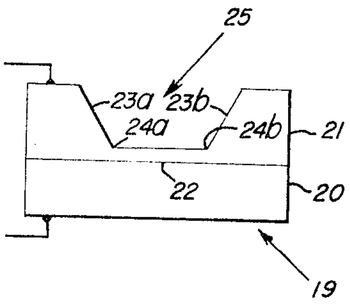
FIG. 2 is a side sectional view of a strain transducer having a junction diffused in prior to the formation of an improved notch.

In FIG. 2, there is shown a notched semiconductor transducer 19. This transducer comprises a first region of semiconductor material 20 and a second region 21. These two regions contact each other at a junction 22. The junction 22 is formed prior to the formation of the notch 25. This junction is preferably formed utilizing present day diffusion techniques. The notch 25 is then formed in the same manner as described with reference to the technique utilized for the device of FIG. 1. It is to be noted that notch 25 is formed solely in the region of semiconductor material 21 after the formation of the junction 22.

To utilize the devices of FIGS. 1 and 2, ohmic contacts are made to the regions of semiconductor materials on opposite surfaces of the rectifying junctions as shown in the figures.

Figures 3, 4:
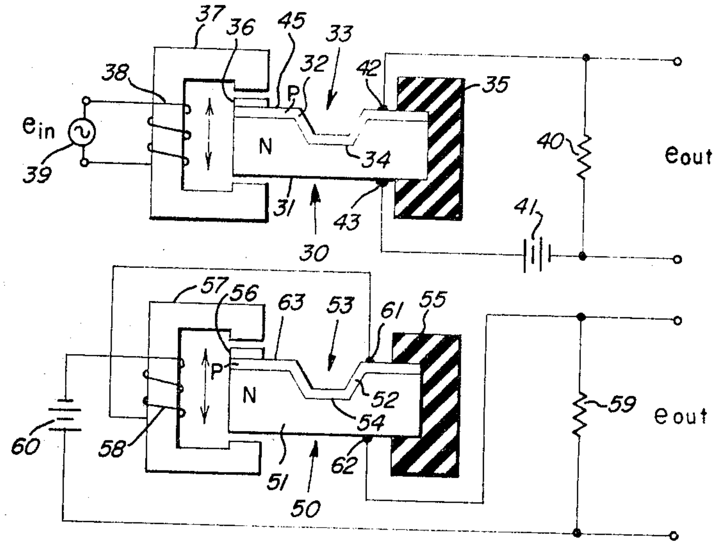
FIG. 3 is a diagrammatic illustration of a filter utilizing a notched strain transducer in accordance with this invention.
FIG. 4 is a diagrammatic illustration of an oscillator utilizing a notched strain transducer in accordance with this invention.

Referring now to FIG. 3, there is shown a notched strain transducer device of this invention, such as the type shown in FIG. 1, utilized in a filter. This filter is particularly suitable for filtering audio frequency signals. This notched filter provides the advantage of complete isolation between input and output signals. The filter comprises a semiconductor transducer body 30. Transducer body 30 comprises an N-doped semiconductor region 31 in contact with a P-doped semiconductor region 32. Disposed between said N and P regions is a strain sensitive shallow barrier or rectifying junction 34. There is also shown a notch 33 of the type described with relation to FIGS. 1 and 2. A rigid support member 35 is shown surrounding an end portion of the semiconductor body or device 30. This support holds or restricts the transducer body 30 in such a manner that a cantilever vibratory action or pivotal motion about a point in said body can be produced. On the other end of the semiconductor body 30, a magnetic material 36 is shown coating a top surface 45 of the transducer 30. An electromagnet 37 surrounds the end of the semiconductor body 30 having mounted thereon said magnetic material. The electromagnet 37 has an input winding 38 to which there is applied an input signal by a signal generator 39. This input signal is utilized to provide alternating magnetic fields in the vicinity of magnetic material 36 so as to vibrate the semiconductor body by producing motion at one end of the body 30. The semiconductor transducer body 30 has a sharp self-resonance which varies as a function of the volume and dimensions of the semiconductor body and the size of the notch. These dimensions, for a typical case, will be disclosed at a later time.

Electrical contacts are made at ohmic contacts 42 and 43 connected to semiconductor regions 32 and 31, respectively. Biasing is applied across the junction or barrier 34 by a battery 41 which is connected to a resistor 40 at one end and to ohmic contact 43 at its other end. Resistor 40 is coupled to ohmic contact 42. The output from the filter is obtained across resistor 28. The operation of this device is as follows:

An input signal provided by the signal generator 39 produces a vibratory motion in the direction of the arrows shown in FIG. 3 so as to produce vibrations in the semiconductor body 30. This motion produces vibrations which are particularly pronounced at the self-resonant frequency of the body, which is related to the dimensions and the volume of the semiconductor body. These pronounced vibrations at the self-resonant frequency cause a strain to be produced in the junction 34. The strain is produced or transmitted to the junction by the vibratory motion bending the corners of the notch 33 so as to produce deformation of the lattice structure in the vicinity of the rectifying junction 34. In this manner, the self-resonance of the body, in combination with the amplification provided by the strain produced within the junction or barrier of the semiconductor body 30, provides an amplifier filter output signal across resistor 40. This output signal is a signal which has been filtered from the input provided by the signal generator 39 and is a function of the self-resonant frequency of the semiconductor body 30 and its amplitude is a function of the strain within the junction 34 and the voltage from the bias battery 41.

The biasing shown for the device for FIG. 3 is of such a polarity as to reverse the junction 34, thereby operating the transducer in the reverse current condition. Other embodiments of the filter could be constructed with a forward biasing of the junction 34 so as to operate the transducer of FIG. 3 in a forward conduction condition.

A transducer body which can be utilized in the filter of FIG. 3 could be constructed with the following dimensions: length—.200", height—.006", width—.010"–.015". These dimensions will provide a filtering action in the kilocycle frequency range.

In FIG. 4, there is disclosed a semiconductor notched strain transducer oscillator comprised of a transducer body 50. Transducer body 50 is comprised of first N-type region semiconductor material 51 mounted in contact with a second P-type region of semiconductor material 52. A junction or barrier region 54 is formed between said N and P regions. One end of the semiconductor body 50 is rigidly mounted in a support 55 so as to permit cantilever motion of the opposite unsecured end of the semiconductor body 50 as shown by the arrows in FIG. 4. There is also shown a strain transmitting cornered notch 53 formed in the transducer 50 in a manner as previously mentioned with reference to FIGS. 1 and 2. The notch 53 provides a means for producing a strain in the junction 54 by bending the transducer body 50. The semiconductor body 50 has mounted on its unsecured end a magnetic material 56. An electromagnet 57 is positioned about the magnetic material so as to permit a signal, which is coupled into an input winding 58, to produce electromagnet attraction of a semiconductor body 50 and accordingly, motion in the direction of the arrows shown in FIG. 4. A D.C. bias supply is shown at 60 and is coupled at one end of winding 58. The other end of winding 58 is coupled to ohmic contact 61 which is in contact with semiconductor region 52. Semiconductor region 51, through ohmic contact 62, is connected through a resistance 59 which is then coupled back into supply 60. An output signal is obtained across resistance 59.

The oscillator of FIG. 4 oscillates due to a feed back loop providing a signal to sustain oscillations. Movement of one end of the semiconductor body 50 causes vibrations in the body 50. Due to the volume and dimensions of the body 50, a signal, related to the self-resonant frequency of the body, will be provided. This signal at the self-resonant frequency will then be amplified due to the application of a strain transmitted to the junction 54 by the corners of the notch 53. A portion of this amplified signal is then fed back to the input portion of the circuit in order to sustain or maintain oscillations.

Figure 5:
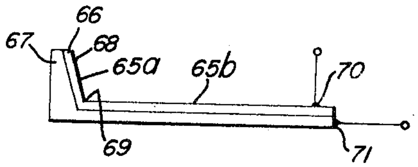
FIG. 5 is a side sectional view of a one corner cantilever notched strain transducer in accordance with this invention.

FIG. 5 is a side sectional view of a single cornered cantilever notched strain transducer in accordance with this invention. The device of FIG. 5 is formed in a manner similar to that described with relation to FIGS. 1 and 2. The primary difference is in the manner of damaging the lattice structure of the substrate prior to removing the damaged area by a preferential etchant. In order to obtain the configuration as shown in FIG. 5, a substrate is first damaged near its end along one line which is parallel to at least one of the lines formed by the intersection of the three 111 cleavage planes with the top surface of the substrate. By etching, the damage induced in an end portion of a substrate, a single corner is obtained. The device of FIG. 5 comprises a first region of semiconductor material 67 in contact with a second region of semiconductor material 68. A barrier or junction region 66 is formed between the two regions of semiconductor materials. A corner of the notch 69 is shown between surfaces 65*a* and 65*b* which form the surfaces remaining after the preferential etching step. Electrical contact to this device is provided by ohmic contacts 70 and 71. The second region of semiconductor material 68 can be formed by standard diffusion techniques after the formation of the notch or the second region can be formed utilizing alloying techniques after the formation of the notch 69.

Figures 6, 7:
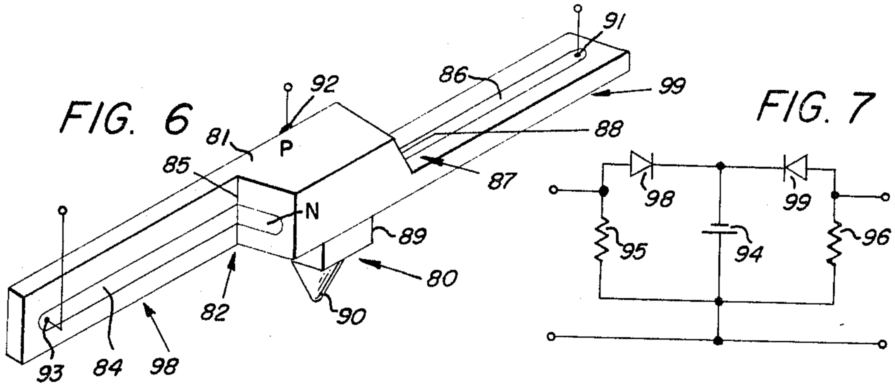
FIG. 6 is an isometric view of a strain transducer pickup for detecting mechanical vibrations in two planes.
FIG. 7 is a diagrammatic illustration of a circuit utilizing the strain transducer pickup of FIG. 6.

Referring now to FIG. 6, a strain transducer pickup 80, for detecting mechanical vibrations in two planes, is disclosed. The strain transducer 80 is fabricated from a single solid block of semiconductor material 81. In this case, 81 is of a silicon material doped with a P-type impurity. Notch 82 is formed in the manner described with relation to FIG. 5. Notch 82 has a strain transmitting corner or vertex 85. Strain transmitting notch 87, having strain transmitting corner 88, is formed in the same manner as the notch 82, except that the notch 87 has its walls lying at substantially 90° with respect to the comparative walls of the notch 82. After the preparation of the notches, an N-type impurity is alloyed into the two notches 82 and 87 to form the N-type portions 84 and 86. In this manner, two diodes 98 and 99 are formed which have strain transmitting corners 85 and 87 lying at substantially 90° with respect to each other. Although alloying is utilized for the embodiment of FIG. 6, diffusion techniques could be utilized to provide consistant results. Mounted on the underside of transducer 80 is a mounting block 89 having a pointed tip 90. Pointed tip 90 permits motion in more than one plane to be applied to device 80. Notch 82 will sense motion of point 90 in the horizontal plane, while the device of notch 87 will sense motion in the vertical plane. Connections are made to these diodes 98 and 99 by ohmic contacts 91 and 93 and common contact 92.

Referring to FIG. 7, there is disclosed a circuit utilizing the strain transducer pick up of FIG. 6. Notched diodes 98 and 99 are biased by a battery 94. Resistors 95 and 96 couple the diodes to the other terminal of the battery 94. Output signals are obtained across resistors 95 and 96, respectively.

Although the devices of this invention have been disclosed with particular reference to the aforementioned semiconductor material types, other types of semiconductor materials could be utilized. Accordingly, it is desired that this invention not be limited except as defined by the appended claims.

What is claimed is:

1. A device sensitive to variations in stress applied to a surface of said device including a body of semiconductor material having a rectifying junction, regions of P and N type conductivity material separated by said junction, a notch extending from a surface of said device through one of said regions of material to a point less than about 0.010″ from said junction, said body having self-resonance which varies as a function of the volume of said body and the size of said notch, means for physically restricting motion of a portion of said body at one side of said notch, and electromechanical driving means for moving an unrestricted portion of said body at the opposite side of said notch to alter the size of said notch and consequently produce a strain in said junction in accordance with an input signal encompassing the known self-resonant frequency of said body.

2. A strain-sensitive device comprising a body of semiconductor material having a P-type region and an N-type region with a P–N junction therebetween, a notch extending from a surface of said body through one of said regions to a point adjacent said junction, said notch having at least one strain-transmitting corner with a radius of curvature less than about 1 micron, said body having self-resonance which varies as a function of the volume of said body and the size of said notch, means for physically restricting motion of a portion of said body at one side of said notch, and electromechanical driving means for moving an unrestricted portion of said body at the opposite side of said notch to alter the size of said notch and consequently produce a strain in said junction adjacent said strain-transmitting corner in accordance with an input signal encompassing said known self-resonant frequency of said body.

3. A device in accordance with claim 2 wherein said junction substantially follows the contours of said notch.

4. A device in accordance with claim 2 wherein said junction is susbtantially parallel to a bottom surface of said notch.

5. A device as set forth in claim 2 wherein circuit means is provided for biasing the junction in a reverse direction.

6. A strain transducer device comprising a body of semiconductor material having a barrier means therein, regions of semiconductor materials separated by said barrier means, means for physically restricting a portion of said body, a notch extending from a surface of said body at one side of the restricting means through a portion of one of said semiconductor materials to a point in proximity to said barrier means, and means for vibrating the unrestricted portion of said body at the opposite side of the notch in accordance with an input signal, said body having a self-resonant frequency at a frequency contained within said input signal, said means comprising an electromagnet having opposite poles overlying said unrestricted portion of the body and having an input winding thereon for receiving said input signal.

7. A strain transducer device in accordance with claim 6 wherein said notch has at least one strain transmitting corner with a radius of curvature less than about one micron.

8. A strain transducer device as set forth in claim 6 wherein said unrestricted portion of the body is provided with a magnetic material thereon.

9. A strain transducer device for sensing the presence of a force in more than one plane comprising a body of semiconductor material having a plurality of P–N junctions therein, a plurality of P- and N-type regions separated by said junctions, and a strain transmitting notch extending through a respective region and terminating adjacent a respective junction, each of said strain transmitting notches having at least one corner disposed at an angle with respect to at least one corner of another notch, said body having self-resonance which varies as a function of the volume of said body and the size of said notches, means for physically restricting motion of a portion of said body between said notches, and electromechanical driving means for moving an unrestricted portion of said body at the opposite sides of respective notches to alter the sizes of said notches and consequently produce strains in said junction in accordance with an input signal encompassing said known self-resonant frequency of said body.

References Cited by the Examiner

UNITED STATES PATENTS

| | | | |
|---|---|---|---|
| 2,167,254 | 7/1939 | Skellet | 331—107 |
| 2,469,569 | 5/1949 | Ohl | 331—107 |
| 2,553,491 | 5/1951 | Schockley | 171—330 |
| 2,600,500 | 6/1952 | Haynes et al. | 333—29 |
| 2,793,420 | 5/1957 | Johnston et al. | 29—155.5 |
| 2,898,477 | 8/1959 | Hoesterey | 307—88 |
| 2,929,885 | 3/1960 | Mueller | 179—121 |
| 2,943,279 | 6/1960 | Mattiat | 333—72 |
| 3,080,640 | 3/1963 | Jochems | 29—155.5 |
| 3,098,895 | 7/1963 | Rhodes | 333—30 |
| 3,174,122 | 3/1965 | Fowler et al. | 333—72 |
| 3,185,935 | 5/1965 | White | 333—30 |
| 3,210,696 | 10/1965 | Philips et al. | 333—70 |

OTHER REFERENCES

White: IRE Int'l. Convention Record, vol. 9, Part *b*, 1961, pp. 304–309.

References Cited by the Applicant

UNITED STATES PATENTS

| | | |
|---|---|---|
| 2,747,090 | 5/1956 | Cavaliere. |
| 2,860,300 | 11/1958 | Sampietro. |
| 3,054,709 | 9/1962 | Freestone et al. |
| 3,074,003 | 1/1963 | Luscher. |
| 3,084,300 | 4/1963 | Sanchez. |
| 3,089,108 | 5/1963 | Gong. |
| 3,097,336 | 7/1963 | Sziklai et al. |

HERMAN KARL SAALBACH, *Primary Examiner.*

J. KOMINSKI, C. BARAFF, *Assistant Examiners.*